(12) United States Patent
Buss et al.

(10) Patent No.: US 12,072,038 B2
(45) Date of Patent: Aug. 27, 2024

(54) ELECTROMAGNETIC VALVE

(71) Applicant: Thomas Magnete GmbH, Herdorf (DE)

(72) Inventors: Juri Buss, Wissen (DE); Daniel Ferres, Betzdorf (DE); Thomas Zastrau, Siegen (DE); Michael Erhard, Dresden (DE)

(73) Assignee: Thomas Magnete GmbH, Herdorf (DE)

( * ) Notice: Subject to any disclaimer, the term of this patent is extended or adjusted under 35 U.S.C. 154(b) by 133 days.

(21) Appl. No.: 17/782,748

(22) PCT Filed: Oct. 28, 2020

(86) PCT No.: PCT/EP2020/080279
§ 371 (c)(1),
(2) Date: Jun. 6, 2022

(87) PCT Pub. No.: WO2021/115679
PCT Pub. Date: Jun. 17, 2021

(65) Prior Publication Data
US 2023/0003310 A1 Jan. 5, 2023

(30) Foreign Application Priority Data
Dec. 9, 2019 (DE) ...................... 10 2019 133 479.9

(51) Int. Cl.
*F16K 31/06* (2006.01)
(52) U.S. Cl.
CPC ...... *F16K 31/0675* (2013.01); *F16K 31/0613* (2013.01); *F16K 31/0668* (2013.01)
(58) Field of Classification Search
CPC ............ F16K 31/0613; F16K 31/0693; Y10T 137/8671; B60T 8/364
See application file for complete search history.

(56) References Cited

U.S. PATENT DOCUMENTS 3,285,285 A * 11/1966 Bielefeld ............ F15B 13/0405
251/129.21
3,970,111 A * 7/1976 Brune ................... B60T 15/028
303/119.2
(Continued)

FOREIGN PATENT DOCUMENTS

DE 4221757 A1 1/1994
DE 4406777 A1 9/1995
(Continued)

OTHER PUBLICATIONS

International Preliminary Report on Patentability regarding Patent Application No. PCT/EP2020/080279, dated May 17, 2022.
(Continued)

*Primary Examiner* — Matthew W Jellett
(74) *Attorney, Agent, or Firm* — Harness, Dickey & Pierce, P.L.C.

(57) ABSTRACT

The invention relates to an electromagnetic valve comprising an electromagnet including a magnet coil, a magnet armature, a pole piece, a magnet yoke and a housing closing the magnetic circuit, and a valve assembly including a valve sleeve, a valve slider and a return spring, wherein the valve assembly is encompassed by the housing in its axial extension. According to the invention, the pole piece consists of an outer magnet pole and the valve sleeve surrounded by the magnet pole, wherein two fluid channels run in an axial direction between the valve sleeve and the magnet pole in fluid-tightly adjacent zones on the circumference of the valve sleeve and/or within the magnet pole, and wherein the valve sleeve has two transverse boreholes which are fluidically connected to the fluid channels and cooperate with control edges of the valve slider according to an axial position of the valve slider.

12 Claims, 3 Drawing Sheets

(56) References Cited

U.S. PATENT DOCUMENTS

Figure 1:
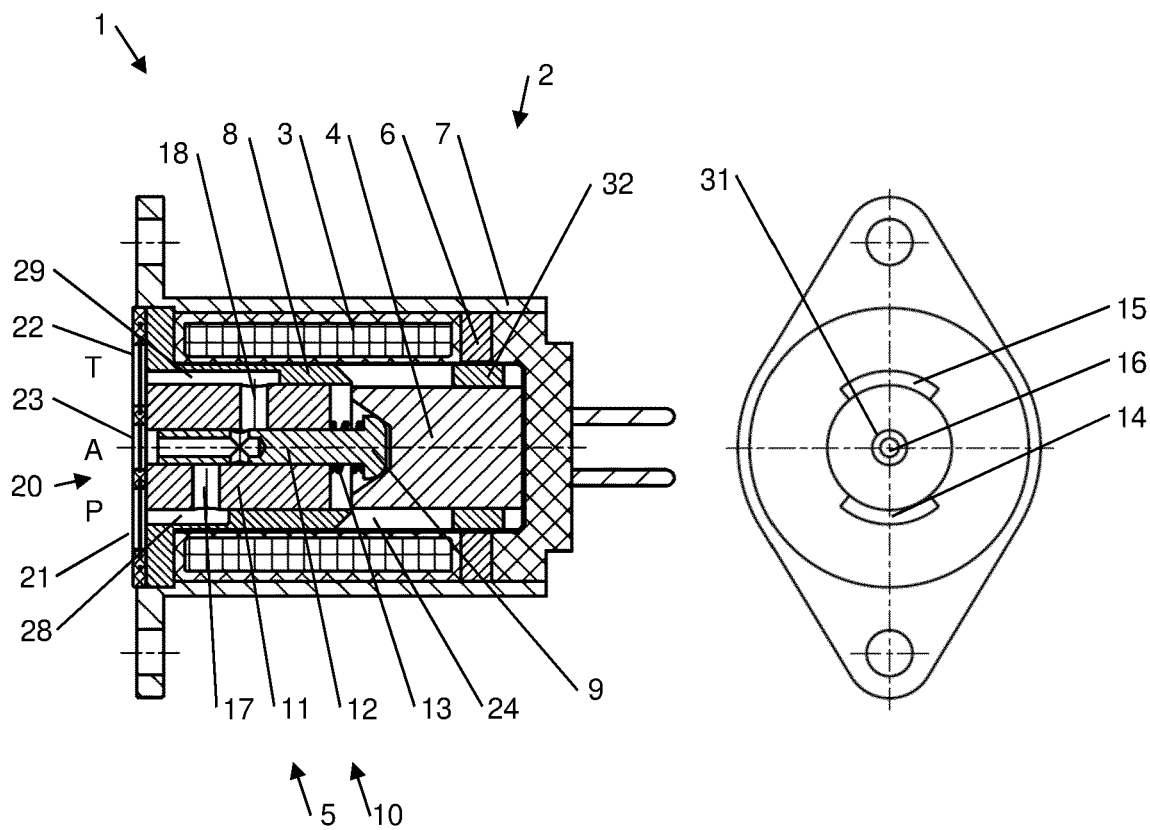

| | | | | |
|---|---|---|---|---|
| 3,989,063 | A | * | 11/1976 | Brouwers ............ F16K 31/0631 303/119.2 |
| 4,662,605 | A | * | 5/1987 | Garcia ................ F16K 31/0613 251/129.08 |
| RE32,644 | E | * | 4/1988 | Brundage ............ F16K 31/0651 251/30.01 |
| 5,323,809 | A | * | 6/1994 | Tischer ............... F16K 31/0693 137/513.5 |
| 5,465,937 | A | * | 11/1995 | Nokubo ................ B60T 8/5037 251/30.01 |
| 5,584,323 | A | * | 12/1996 | Yamamuro ......... F15B 13/0402 251/282 |
| 5,765,930 | A | * | 6/1998 | Kervagoret ........ G05D 16/2097 303/119.2 |
| 5,921,281 | A | * | 7/1999 | Takayama ............... B60T 8/364 303/119.2 |
| 11,199,271 | B2 | * | 12/2021 | Peterson ............. F16K 31/0655 |
| 11,346,458 | B2 | * | 5/2022 | Wechsel .............. F16K 31/0693 |

FOREIGN PATENT DOCUMENTS

| | | |
|---|---|---|
| DE | 102012010986 A1 | 12/2013 |
| DE | 102014015559 A1 | 4/2016 |

OTHER PUBLICATIONS

Communication in Cases for Which no Other From is Available regarding Patent Application No. PCT/EP2020/080279, dated Mar. 16, 2021.

International Search Report (English and German) of the International Searching Authority issued in PCT/EP2020/080279, mailed Feb. 23, 2021; ISA/EP.

* cited by examiner

ELECTROMAGNETIC VALVE

CROSS REFERENCE TO RELATED APPLICATIONS

This application is a 371 National Stage of International Application No. PCT/EP2020/080279, filed on Oct. 28, 2020, which claims the benefit of and priority to German Patent Application 10 2019 133 479.9, filed on Dec. 9, 2019. The entire disclosures of the above applications are incorporated by reference herein.

FIELD

The invention relates to an electromagnetic valve, having an electromagnet which comprises at least one magnet coil, a magnet armature, a pole core, magnet yoke and a housing which closes the magnetic circuit, and a valve assembly which comprises at least one valve sleeve, a valve slide and a restoring spring, the valve assembly being enclosed completely by the housing.

BACKGROUND

For example, documents DE 10 2012 010 986 A1 and DE 10 2014 015 559 A1 are known from the prior art, which documents describe electromagnetic valves, the valve assemblies of which are enclosed by the housing of the electromagnet. The production of these electromagnetic valves is complicated, and the solid friction which occurs during operation of the electromagnets reduces the accuracy with regard to the functional chain which is produced by the electromagnetic valves.

It is a problem of the present invention to simplify the production of the electromagnetic valve and to make it less expensive, and to decrease the solid friction between the movable components in one development of the invention.

These problems are solved by way of the features of the first patent claim; the subclaims develop this solution.

SUMMARY

The invention includes the technical teaching that the pole core consists of an outer magnetic pole and a valve sleeve which is enclosed by the magnetic pole, at least two fluid ducts running in the axial direction of the abovementioned components between the valve sleeve and the magnetic pole in zones which are delimited in a fluid-tight manner on the circumference of the valve sleeve.

Here, the valve sleeve has at least two cavities, preferably transverse bores, which run at a right angle with respect to the center axis of the valve sleeve and are connected fluidically to the abovementioned fluid ducts and, in interaction with the control edges of the valve slide, determine the function of the valve assembly in a manner which is dependent on the axial position of the valve slide.

A fluidic connection which can be produced extremely inexpensively is provided between the transverse bores in the valve sleeve and the fluidic connectors by way of the fluid ducts which are arranged between the valve sleeve and the magnetic pole, and the transverse bores inexpensively produce control edges which interact with the control edges of the valve slide in a manner which opens or closes the valve. In this way, pressure control functions, throttle functions or switching functions can be produced in a known way as valve functions, throttle functions and switching functions acting in a known way via the stroke of the valve slide, which stroke is produced by way of the electromagnet counter to the force of the restoring spring, while pressure control functions are achieved in a known way, by a pressure force which acts on the valve slide being compared mechanically with that force of the electromagnet which likewise acts on the valve slide, and the valve slide stroke which results from the force difference releasing fluidic throughflows from the P connector to the A connector or from the A connector to the T connector.

In a first embodiment, the at least two fluid ducts for the connectors P and T advantageously run in cavities of the magnetic pole, the axial lengths of the cavities being dimensioned in such a way that there is firstly a fluid connection to in each case one sealed flange zone of a flange face and secondly there is in each case a fluid connection to the transverse bores in the valve sleeve, and, furthermore, a fluid connection of the connector P to an armature space of the electromagnet is shut.

Here, the connectors P and T are connected to the flange zones of the flange face, and the armature space of the electromagnet is preferably connected to the connector T, via the fluid duct which emanates from the connector T or via another fluidic connection.

A course of the fluid ducts in the cavities of the magnetic pole can be produced in a particularly inexpensive way if the magnetic pole is produced by way of a sintering process; here, the fluid ducts are produced by way of the pressing tool. In the case of this embodiment, the third fluid duct for the connector A is produced by way of a central bore in the valve sleeve, which bore also receives the valve slide. The third fluid duct does not require an additional cavity in this embodiment.

In a second advantageous embodiment, the fluid ducts for the connectors P and T run in flattened portions and/or grooves of the valve sleeve, the axial lengths of the flattened portions and/or grooves likewise being dimensioned in such a way that firstly there is a fluid connection to in each case one sealed flange zone of a flange face and secondly there is in each case a fluid connection to the transverse bores in the valve sleeve, and, furthermore, a fluid connection of the connector P to the armature space is shut.

Axial or obliquely running bores for the fluid ducts P and T are not required either in the case of this second embodiment.

The abovementioned axially running fluid ducts are preferably configured as flattened portions; if greater cross sections are required, however, or flattened portions are to be ruled out for production reasons, they are configured as grooves, or both flattened portions and grooves are provided.

In one variant of the first embodiment, not only two, but rather three fluid ducts for the connectors P, T and A run in cavities of the magnetic pole, the lengths of the cavities being dimensioned in such a way that firstly there is a fluid connection to in each case one sealed flange zone of a flange face and secondly there is in each case a fluid connection to the first and the second transverse bore and to a third transverse bore in the valve sleeve, and, furthermore, in each case a fluid connection of the connectors P and A to the armature space of the electromagnet is shut.

In the case of this variant of the first embodiment, all three flange zones on the flange face are arranged at the same spacing from the center of the flange face; therefore, more space is available for the connector A. The designer has the freedom here to load or not to load an end face of the valve slide with the pressure of the connector A, depending on the embodiment of the valve slide and the task of the valve.

In one variant of the second embodiment, three fluid ducts for the connectors P, T and A run in flattened portions of the valve sleeve, the lengths of the flattened portions being dimensioned in such a way that firstly there is a fluid connection to in each case one sealed flange zone of a flange face and secondly there is in each case a fluid connection to the first and the second transverse bore and a third transverse bore in the valve sleeve, and, furthermore, in each case a fluid connection of the connectors P and A to the armature space is shut.

In one advantageous embodiment, the magnet armature is radially mounted firstly in a bearing and secondly by way of a slide head of the valve slide, the magnet armature making contact by way of a conical face with the slide head, and it being possible for radial forces to be transmitted from the magnet armature to the slide head. In the case of this embodiment, a high precision of the relative radial position of the magnet armature with respect the magnetic pole can be produced inexpensively, without additional mounting of the magnet armature in the magnetic pole. The solid friction on the magnet armature is particularly low in the case of this embodiment.

In another advantageous embodiment, the effective length of the bearing for mounting the magnet armature corresponds to at least one third of the length of the magnet armature, preferably half the length and further preferably 70% of the length, the magnet armature making contact by way of a planar face with the slide head of the valve slide, and the valve slide having a flattened slide head which permits only a transmission of an axial pressure force from the magnet armature to the slide head.

This embodiment concerns proven prone mounting of the magnet armature; the flattened slide head prevents a transmission of radially acting forces to the valve slide which, on account of its low diameter play relative to the valve sleeve, can absorb only low radial forces if its solid friction is to remain low.

In the case of the first embodiment of the electromagnetic valve, the flange face has three flange zones, the third flange zone being connected fluidically to a central bore in the valve sleeve, which bore receives the valve slide, and the three flange zones being sealed with respect to one another and with respect to the surroundings by way of a shaped seal. The use of the shaped seal simplifies the connection of the electromagnetic valve to a further apparatus which supports the electromagnetic valve and contains the abovementioned fluidic lines.

The three flange zones are also sealed with respect to one another and with respect to the surroundings by way of a shaped seal in the case of the second embodiment of the electromagnetic valve, but no central flange zone for the connector A is provided here. The flange zone for the connector A can be of greater configuration in the case of this second embodiment than in the case of the first embodiment.

The shaped seal advantageously comprises three filter mats which are arranged in the flange zones and are connected to the material of the shaped seal in a non-positive, positively locking or integrally joined manner. The arrangement of the filters as filter mats in the shaped seal simplifies the assembly and therefore decreases the production costs.

The electromagnetic valve according to the invention can be used, for example, as a pressure control valve in the design of a three-way pressure control valve, a first volume at a fluidic pressure to be controlled being connected to the connector A, a second volume at a supply pressure being connected to the connector P, and a line which leads to a supply tank being connected to the connector T.

Here, a force equilibrium between the force of the electromagnet and the pressure force of the fluid at the connector A is brought about in the electromagnetic valve at the valve slide, a fluidic connection between the connector P and the connector A being brought about in the valve assembly in the case where the force of the electromagnet is predominant, and a fluidic connection between the connector A and the connector T being brought about in the case where the abovementioned pressure force is predominant.

The electromagnetic valve according to the invention can also be used in a known way as a fluidic switching valve (also called a directional valve) in the case of a suitable design of the components of the valve assembly, by there being a fluidic connection between the connector A and the connector T in the valve assembly in the case of a non-energized electromagnet, and/or by there being a fluidic connection between the connector P and the connector A in the valve assembly in the case of a sufficiently energized electromagnet.

An application of the invention is also possible which produces a fluidic connection between the connector P and the connector A in the valve assembly in the case of a non-energized electromagnet, and/or which produces a fluidic connection between the connector A and the connector T in the valve assembly in the case of a sufficiently energized electromagnet.

There is sufficient energization of the electromagnet here when the magnetic force which results from the energization is sufficient under all proper operating conditions to move the valve slide out of a rest position into a working position counter to the force of the restoring spring, counter to the active pressure forces of the connected fluid volumes and counter to the frictional forces on the valve slide, the fluidic connection between the connector P and the connector A existing in the working position.

In the case of a suitable design, the directional valve can also be operated with a proportional action in a known way; a proportional stroke of the valve slide which for its part determines the fluid connections through the valve assembly then corresponds to the electric current through the magnet coil. Here, the valve slide is configured in such a way that it does not have an active face for the connected pressures of the connectors A and P.

DRAWINGS

The drawings described herein are for illustrative purposes only of selected embodiments and not all possible implementations, and are not intended to limit the scope of the present disclosure.

Figure 2:
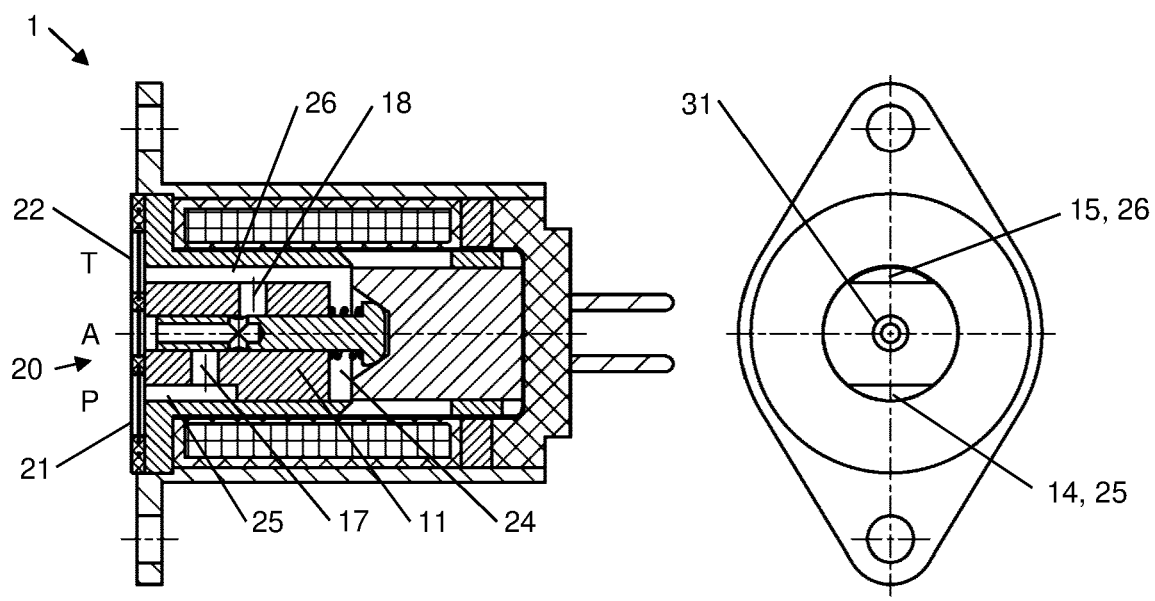
Figure 3:
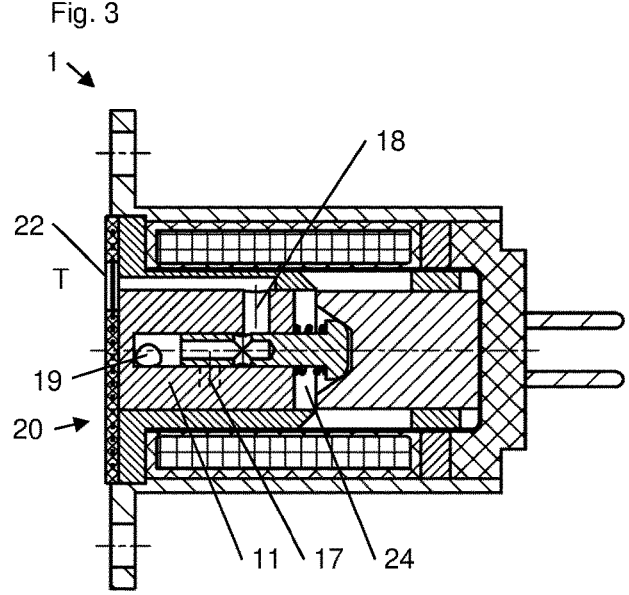
Figure 4:
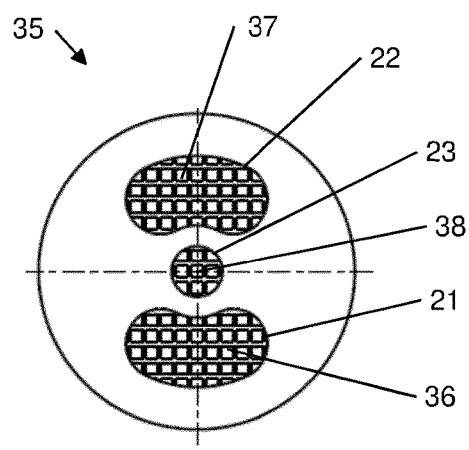
Figure 4:
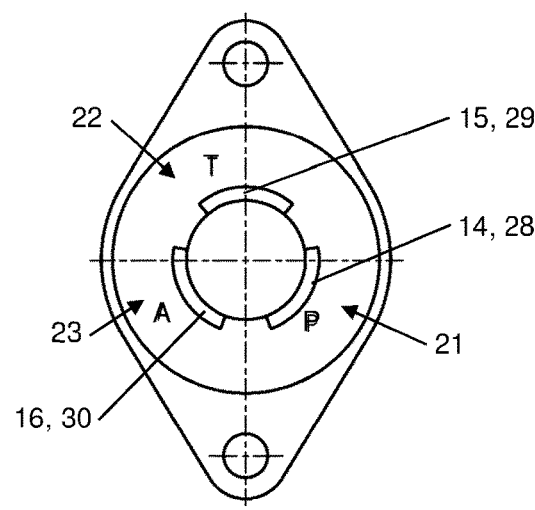
Figure 5:
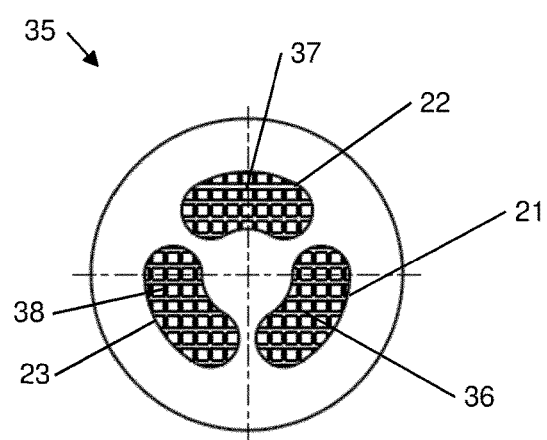
Figure 6:
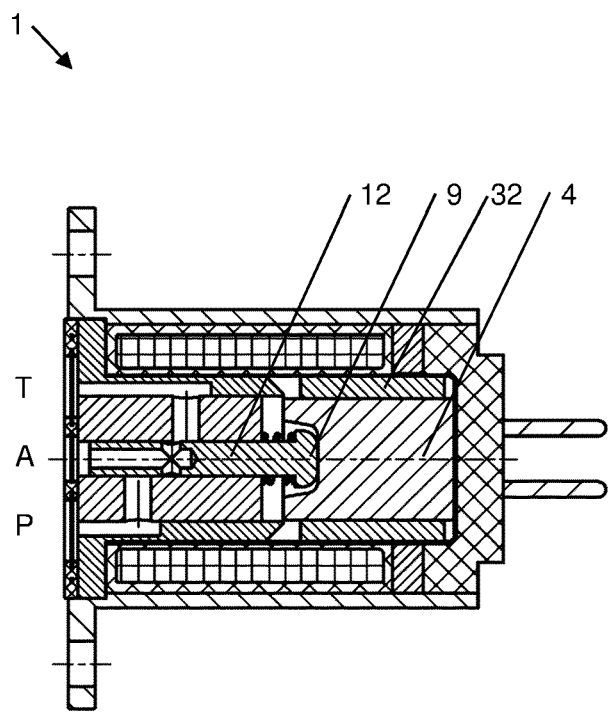

FIG. 1 shows a sectional illustration of the first embodiment of the electromagnetic valve, FIG. 2 shows a sectional illustration of the second embodiment of the electromagnetic valve, FIG. 3 shows a sectional illustration of the third embodiment of the electromagnetic valve, FIG. 4 shows a view of the shaped seal of the first embodiment with the filter mat, FIG. 5 shows a view of the shaped seal of the second embodiment, and FIG. 6 shows a sectional illustration of the fourth embodiment of the electromagnetic valve.

DETAILED DISCRIPTION

Example embodiments will now be described more fully with reference to the accompanying drawings.

FIG. 1 shows an electromagnetic valve 1 according to the invention which has an electromagnet 2 which comprises a magnet coil 3, a magnet armature 4, a pole core 5, a magnet yoke 6 and a housing 7 which closes the magnetic circuit. Furthermore, the electromagnetic valve 1 has a valve assembly 10 which comprises a valve sleeve 11, a valve slide 12 and a restoring spring 13, the valve assembly 10 being enclosed completely by a housing 7. The pole core 5 consists of an outer magnetic pole 8 and a valve sleeve 11 which is enclosed by the magnetic pole 8, at least two fluid ducts 14, 15 running in the axial direction between the valve sleeve 11 and the magnetic pole 8 in zones which are delimited in a fluid-tight manner on the circumference of the valve sleeve 11. Here, the valve sleeve 11 has at least two transverse bores 17, 18 which are connected fluidically to the fluid ducts 14, 15 and, in interaction with control edges of the valve sleeve 12, perform the valve function in a manner which is dependent on an axial position of the valve slide 12.

In the embodiment of the electromagnetic valve 1 in accordance with FIG. 1, the at least two fluid ducts 14, 15 for the connectors P and T run in cavities 28, 29 of the magnetic pole 8, the axial lengths of the cavities 28, 29 being dimensioned in such a way that firstly there is a fluid connection to in each case one sealed flange zone 21, 22 of a flange face 20 and secondly there is in each case a fluid connection to the transverse bores 17, 18 in the valve sleeve 11, and, furthermore, a fluid connection of the connector P to the armature space 24 is shut.

In the embodiment of the electromagnetic valve 1 in accordance with FIG. 2, the fluid ducts 14, 15 for the connectors P and T run in flattened portions 25, 26 of the valve sleeve 11, the axial lengths of the flattened portions 25, 26 being dimensioned in such a way that firstly there is a fluid connection to in each case one sealed flange zone 21, 22 of the flange face 20 and secondly there is in each case a fluid connection to the transverse bores 17, 18 and the valve sleeve 11, and, furthermore, a fluid connection of the connector P to the armature space 24 is shut.

In the embodiment of the electromagnetic valve 1 in accordance with FIG. 3, three fluid ducts 14, 15, 16 for the connectors P, T and A run in cavities 28, 29, 30 of the magnetic pole 8, the axial lengths of the cavities 28, 29, 30 being dimensioned in such a way that firstly there is a fluid connection to in each case one sealed flange zone 21, 22, 23 of a flange face 20 and secondly there is in each case a fluid connection to the first and the second transverse bore 17, 18 and to a third transverse bore 19 in the valve sleeve 11, and, furthermore, in each case a fluid connection of the connectors P and A to the armature space 24 is shut.

In a further embodiment (not shown), three fluid ducts 14, 15, 16 for the connectors P, T and A run in flattened portions 25, 26, 27 of the valve sleeve 11, the lengths of the flattened portions 25, 26, 27 being dimensioned in such a way that firstly there is a fluid connection to in each case one sealed flange zone 21, 22, 23 of a flange face 20 and secondly there is in each case a fluid connection to the first and the second transverse bore 17, 18 and a third transverse bore 19 in the valve sleeve 11, and, furthermore, in each case a fluid connection of the connectors P and A to the armature space 24 is shut.

In the embodiments of the electromagnetic valve 1 in accordance with FIG. 1, the magnet armature 4 is radially mounted firstly in a bearing 32 and secondly by way of a slide head 9 of the valve slide 12, the magnet armature 4 making contact by way of a conical face with the slide head 9, and it being possible for radial forces to be transmitted from the magnet armature 4 to the slide head 9.

In the embodiment of the electromagnetic valve 1 according to FIG. 6, the effective length of the bearing 32 for mounting the magnet armature 4 corresponds to at least one third of the length of the magnet armature 4, preferably half the length and further preferably 70% of the length, the magnet armature 4 making contact by way of a planar face with the slide head 9 of the valve slide 12, and the valve slide 12 having a flattened slide head 9 which permits only a transmission of an axial pressure force from the magnet armature 4 to the slide head 9.

In the embodiment of the electromagnetic valve 1 according to FIG. 1 and FIG. 2, the flange face 20 has three flange zones 21, 22, 23, the third flange zone 23 being connected fluidically to a central bore 31 in the valve sleeve 11, which bore 31 receives the valve slide 12, and the three flange zones 21, 22, 23 being sealed with respect to one another and with respect to the surroundings by way of a shaped seal 35 which is shown in FIG. 4.

FIG. 5 shows the shaped seal for an electromagnetic valve in the embodiment according to FIG. 3, three flange zones 21, 22, 23 also being sealed here with respect to one another and with respect to the surroundings by way of a shaped seal 35.

In the embodiments of the shaped seal 35 according to FIGS. 4 and 5, the shaped seal 35 comprises in each case three filter mats 36, 37, 38 which are arranged in the flange zones 21, 22, 23 and are connected to the material of the shaped seal 35 in a non-positive, positively locking or integrally joined manner.

The preceding description according to the present invention serves only for illustrative purposes and not for the purpose of restricting the invention. Within the context of the invention, various amendments and modifications are possible, without departing from the scope of the invention and its equivalents.

LIST OF DESIGNATIONS

1 Electromagnetic valve
2 Electromagnet
3 Magnet coil
4 Magnet armature
5 Pole core
6 Magnet yoke
7 Housing
8 Magnetic pole
9 Slide head
10 Valve assembly
11 Valve sleeve
12 Valve slide
13 Restoring spring
14 First fluid duct
15 Second fluid duct
16 Third fluid duct
17 First transverse bore
18 Second transverse bore
19 Third transverse bore
20 Flange face
21 First flange zone
22 Second flange zone
23 Third flange zone
24 Armature space
25 First flattened portion
26 Second flattened portion
27 Third flattened portion
28 First cavity
29 Second cavity 30 Third cavity
31 Bore
32 Bearing
35 Shaped seal
36 Filter mat
37 Filter mat
38 Filter mat

The invention claimed is:

1. An electromagnetic valve comprising:
an electromagnet having at least one magnet coil;
a magnet armature;
a pole core;
a magnet yoke;
a housing which closes the electromagnet; and
a valve assembly having a valve sleeve; a valve slide; and a restoring spring;
wherein the valve assembly being enclosed in its axial extent by the housing;
wherein the pole core includes an outer magnetic pole and the valve sleeve which is enclosed by the outer magnetic pole, at least two fluid ducts running in an axial direction between the valve sleeve and the outer magnetic pole in zones which are delimited in a fluid-tight manner on a circumference of the valve sleeve and/or within the outer magnetic pole;
wherein the valve sleeve having at least two transverse bores or other cavities which run perpendicularly with respect to a center axis of the valve sleeve and are connected fluidically to the at least two fluid ducts and interact with the valve slide in a manner which is dependent on an axial position of the valve slide;
wherein the magnet armature is radially mounted firstly in a bearing and secondly by way of a slide head of the valve slide, the magnet armature making contact by way of a conical face with the slide head, and it being possible for radial forces to be transmitted from the magnet armature to the slide head.

2. The electromagnetic valve as claimed in claim 1, wherein the at least two fluid ducts for connectors (P) and (T) are defined in cavities of the outer magnetic pole, axial lengths of the cavities being dimensioned in such a way that there is firstly a fluid connection to in each case one sealed flange zone of a flange face and secondly there is in each case a fluid connection to the at least two transverse bores in the valve sleeve, and, furthermore, a fluid connection of the connector (P) to an armature space is shut.

3. The electromagnetic valve as claimed in claim 1, wherein the at least two fluid ducts for connectors (P) and (T) are defined in flattened portions and/or grooves of the valve sleeve, axial lengths of the flattened portions and/or grooves being dimensioned in such a way that firstly there is a fluid connection to in each case one sealed flange zone of a flange face and secondly there is in each case a fluid connection to the at least two transverse bores in the valve sleeve, and, furthermore, a fluid connection of the connector (P) to an armature space is shut.

4. The electromagnetic valve as claimed in claim 1, wherein three fluid ducts for the connectors (P), (T) and (A) are defined in cavities of the outer magnetic pole, lengths of the cavities being dimensioned in such a way that firstly there is a fluid connection to in each case one sealed flange zone of a flange face and secondly there is in each case a fluid connection to a first and a second transverse bore of the at least two transverse bores and to a third transverse bore in the valve sleeve, and, furthermore, in each case a fluid connection of the connectors (P) and (A) to an armature space is shut.

5. The electromagnetic valve as claimed in claim 1, wherein three fluid ducts for the connectors (P), (T) and (A) are defined in flattened portions and/or grooves of the valve sleeve, lengths of the flattened portions and/or grooves being dimensioned in such a way that firstly there is a fluid connection to in each case one sealed flange zone of a flange face and secondly there is in each case a fluid connection to a first and a second transverse bore of the at least two transverse bores and a third transverse bore in the valve sleeve, and, furthermore, in each case a fluid connection of the connectors (P) and (A) to an armature space is shut.

6. An electromagnetic valve comprising:
an electromagnet having at least one magnet coil;
a magnet armature;
a pole core;
a magnet yoke;
a housing which closes the electromagnet; and
valve assembly having a valve sleeve; a valve slide; and a restoring spring;
wherein the valve assembly being enclosed in its axial extent by the housing;
wherein the pole core includes an outer magnetic pole and the valve sleeve which is enclosed the outer magnetic pole, at least two fluid ducts running in an axial direction between the valve sleeve and the outer magnetic pole in zones which are delimited in a fluid-tight manner on a circumference of the valve sleeve and/or within the magnetic pole;
wherein the valve sleeve having at least two transverse bores or other cavities which run perpendicularly with respect to a center axis of the valve sleeve and are connected fluidically to the at least two fluid ducts and interact with the valve slide in a manner which is dependent on an axial position of the valve slide;
wherein an effective length of a bearing for mounting the magnet armature corresponds to at least one third of a length of the magnet armature, half the length or 70% of the length, the magnet armature making contact by way of a planar face with a flattened slide head of the valve slide, and the valve slide having the flattened slide head permits only a transmission of an axial pressure force from the magnet armature to the flattened slide head.

7. The electromagnetic valve as claimed in claim 3, wherein the flange face has three flange zones, a third flange zone being connected fluidically to a central bore in the valve sleeve, which bore receives the valve slide, and the three flange zones being sealed with respect to one another and with respect to the surroundings by way of a shaped seal.

8. The electromagnetic valve as claimed in claim 4, wherein the three flange zones are sealed with respect to one another and with respect to the surroundings by way of a shaped seal.

9. The electromagnetic valve as claimed in claim 7, wherein the shaped seal comprises three filter mats which are arranged in the three flange zones and are connected to material of the shaped seal in a non-positive, positively locking or integrally joined manner.

10. The electromagnetic valve as claimed in claim 1, wherein a force equilibrium between a force of the electromagnet and a pressure force of fluid at a connector (A) being brought about in the electromagnetic valve at the valve slide, and a fluidic connection between a connector (P) and the connector (A) being brought about in the valve assembly in the case where the force of the electromagnet is predominant, and a fluidic connection between the connector (A) and a connector (T) being brought about in the case where the pressure force is predominant.

11. The electromagnetic valve as claimed in claim 1, wherein there is a fluidic connection between a connector (A) and a connector (T) in the valve assembly in the case of a non-energized electromagnet, and/or in that there is a fluidic connection between a connector (P) and the connector A in the valve assembly in the case of a sufficiently energized electromagnet.

12. The electromagnetic valve as claimed in claim 1, wherein there is a fluidic connection between a connector (P) and a connector (A) in the valve assembly in the case of a non-energized electromagnet, and/or in that there is a fluidic connection between the connector (A) and a connector (T) in the valve assembly in the case of a sufficiently energized electromagnet.

* * * * *

UNITED STATES PATENT AND TRADEMARK OFFICE
CERTIFICATE OF CORRECTION

PATENT NO. : 12,072,038 B2
APPLICATION NO. : 17/782748
DATED : August 27, 2024
INVENTOR(S) : Juri Buss et al.

Page 1 of 1

It is certified that error appears in the above-identified patent and that said Letters Patent is hereby corrected as shown below:

In the Claims

Column 7, Claim 4, Line 61, after "for", delete "the"

Column 8, Claim 5, Line 5, after "for", delete "the"

Column 8, Claim 6, Line 21, before "valve assembly", insert --a--

Column 8, Claim 6, Line 26, after "enclosed", insert --by--

Column 8, Claim 6, Line 31, after "the", insert --outer--

Column 8, Claim 8, Line 54, after "wherein", delete "the"

Signed and Sealed this
Twenty-ninth Day of April, 2025

Coke Morgan Stewart
*Acting Director of the United States Patent and Trademark Office*